United States Patent [19]

Sample, Jr. et al.

[11] 4,026,874

[45] May 31, 1977

[54] SCALE CONTROL

[75] Inventors: Thomas E. Sample, Jr.; James W. Hughes; Jack F. Tate, all of Houston, Tex.

[73] Assignee: Texaco Inc., New York, N.Y.

[22] Filed: June 25, 1975

[21] Appl. No.: 590,001

Related U.S. Application Data

[60] Division of Ser. No. 296,399, Oct. 10, 1972, Pat. No. 3,925,582, which is a continuation-in-part of Ser. No. 141,892, May 10, 1971, abandoned.

[52] U.S. Cl. .............. 260/77.5 MA; 260/77.5 AM; 260/77.5 AA
[51] Int. Cl.² ................ C08G 18/12; C08G 18/06
[58] Field of Search .......... 260/77.5 MA, 77.5 AM, 260/77.5 AP

[56] References Cited

UNITED STATES PATENTS

| | | | |
|---|---|---|---|
| 3,425,973 | 2/1969 | Shaw | 260/18 TN |
| 3,499,783 | 3/1970 | Nelson et al. | 428/161 |
| 3,737,391 | 6/1973 | Feltzin et al. | 260/77.5 AP X |
| 3,875,086 | 4/1975 | Ramey et al. | 260/77.5 MA X |

*Primary Examiner*—Lewis T. Jacobs
*Attorney, Agent, or Firm*—Thomas H. Whaley; Carl G. Ries; Kenneth R. Priem

[57] ABSTRACT

This invention concerns methods of imparting properties of scale resistance to surfaces upon which adherent scale is normally prone to form during contact with mineralized waters through the use of novel; polyurethane-type resins, characterized by containing pendant polyoxyalkylene chains attached to a basic polyurethane skeletal network.

11 Claims, No Drawings

SCALE CONTROL

This application is a division of Ser. No. 296,399, filed Oct. 10, 1972, now U.S. Pat. No. 3,925,582, which is a continuation-in-part of application Ser. No. 141,892, filed May 10, 1971, now abandoned.

This invention concerns methods of inhibiting and/or controlling mineral-scale formation upon surfaces which are normally susceptible to scale formation during contact with mineralized waters.

More particularly, this invention concerns the production of scale-resistant coatings and articles through the use of novel resins of the polyurethane type characterized by having as integral parts of their molecular structure "pendant" polyoxyalkylene chains; pendant polyoxyalkylene chains being defined herein as polyoxyalkylene chains which are attached by primary chemical bonds at one end only to the polymeric skeletal network.

Mineralized or "hard" waters as defined throughout this application are waters containing in solution alkaline earth and/or iron compounds which upon alteration of environmental conditions are prone to deposit mineral scale therefrom on surfaces contacting them.

BACKGROUND OF THE INVENTION

Inorganic mineral scale concretion or the deposition of scale coatings derived from the extended contact of surfaces normally susceptible to scale formation with hard waters, particularly waters containing alkaline earth and/or iron compounds, is both wasteful and commonplace. While scale formation upon metal surfaces presents the more serious problem, non-metallic surfaces including ceramics, glasses and organic polymers may also undergo scaling.

Particularly troublesome are the tenacious "furs" or "crusts" that form in operational processing equipment in continuous and/or prolonged contact with aqueous solutions of inorganic salts as, for example, alkaline earth sulfates, carbonates and bicarbonates. This type of scale formation creates serious problems for the petroleum and gas-producing industries, where the build-up of undesirable inorganic mineral scale deposits can take place in equipment or tubing of difficult or limited accessibility. These include flow lines in both surface and subterranean locations, including auxiliary producing equipment, such as heaters, pumps, valves, rods, and the like. In addition, scale formation can also cause substantial problems in the chemical processing industries, public utilities, and in other situations where mineral-laden water is processed or used, as in heat exchangers, storage vessels, piping, reactors, evaporators, and the like.

Several different explanations have been advanced as to how the formation of mineral scale deposits, such as for example calcium or barium sulfate, takes place. One mechanism leading to scale formation comes about from the mingling of a fluid stream containing a substantial concentration of an anion or cation with another stream containing antagonistic counter ions. An illustration of this mechanism would be a case in which one process stream containing a soluble calcium compound contacts another stream containing a soluble sulfate compound to cause precipitation of calcium sulfate. Should the mixing of such incompatible waters take place in a well bore, the result may be deposition of a crust of calcium sulfate which, if allowed, can build up on the surface of submerged equipment such as tubing, and may even choke off fluid flow by diminution of utilizable diameter unless corrective descaling measures are undertaken. In the case of heat exchange equipment, the mineral scale deposition insulates the equipment from the source or sink of heat and increases the cost of operation and may cause extensive maintenance or down-time and increased operational costs.

Another cause of mineral scale formation arises from aqueous solutions of inorganic materials having an inverse solubility curve, that is, a solubility which decreases as the temperature increases. An excellent example of this is calcium sulfate, whose solubility in water decreases with increased temperature. In these instances the solution immediately adjacent to the heating surface reaches saturation the most quickly, dropping calcium sulfate at this juncture which is held tenaciously to the heating surface.

Yet another cause of scale formation is attributable to precipitation of scale materal from supersaturated solutions, of which the preceding example is a special case. When temperature and/or pressure changes occur, or the concentration of some solubilizing substances is substantially decreased, this change of conditions can result in scale formation on the tubing or other equipment being operated.

Whatever the reason or reasons for scale formation may be, as outlined above, it is a troublesome and expensive process that can lead to costly, unscheduled maintenance and even to the breakdown of operational units. For these reasons, a number of remedial measures have been resorted to, both for the removal of scale and mitigation of its formation.

Scale is ordinarily removed by either chemical or mechanical methods, or a combination of both methods. In chemical descaling procedures, the problem is to find a material that will dissolve or loosen the mineral scale without attacking the underlying substrate.

Inhibited hydrochloric acid has proved useful in instances where the scale is acid soluble, as is the case with calcium carbonate scale. Unfortunately, however, many mineral scales, such as those of calcium and barium sulfates, are not appreciably soluble in acids. Calcium sulfate scale can sometimes be dissolved or loosened by treatment with ammonium salts, polyphosphates, or hydroxides, often followed by acid washing.

Mechanical descaling procedures are often resorted to employing such devices as scrapers, brushes, high-pressure abrasive jets, and the like, but these methods are tedious, expensive, and of restricted applicability.

In view of the numerous difficulties inherent in removal by whatever means of mineral scale once formed, the use of scale-preventive methods has been widely practiced for many years. The addition of chemical "scale inhibitors" such as phosphates, both organic and inorganic, tannin materials, chelating agents, natural and synthetic polymers, and the like to scale-prone systems is therefore old in the art. However, the use of such scale inhibitors also suffers serious shortcomings, the most notable being (1) the necessity of maintaining them at constant critical levels of concentration in the systems being protected, (2) the absence of chemical scale inhibitors which provide protection under a diversity of scaling conditions, (3) their general thermal lability and (4) their tendency after prolonged usage to themselves induce the formation of difficult soluble deposits.

As a consequence of the many problems, as outlined in brief above, which are encountered in methods of removing scale already deposited, as well as in the methods of scale prevention as currently practiced, a novel and efficient means is taught by the instant invention whereby the deposition and/or adherence of mineral scale from hard waters upon surfaces may be mitigated or prevented by virtue of a novel protective coating which is at once long lived, environmentally stable, requires little maintenance, and is broad in applicability.

Various types of protective "plastic" coatings are known for use as surface barriers to liquid penetration, weather and the like. For example, U.S. Pat. No. 3,499,783 describes a polyurethane coating used as a protective barrier. However, this disclosure fails to teach anything about scale deposition resistance.

U.S. Pat. No. 3,502,587 discloses scale inhibitor additives which are phosphate esters containing oxyethylene groups. This, of course, is not a coating but an additive to aqueous solutions. Coatings are not mentioned. Oxyethylene groups are taught, but they are also taught in U.S. Pat. No. 3,499,783, above, and impart no scale resistance to that conventional coating. Therefore, the presence of oxyethylene groups is not determinative and does not lead on to our invention to be disclosed herein.

Other disclosures in the art not related to inhibiting of inorganic scale are available. For example, U.S. Pat. No. 3,249,535 teaches a method of using a siloxane copolymer to inhibit paraffin deposition in conduits. Since the present invention is concerned with inorganic mineral scale only, not organic paraffin; and since siloxane compounds are unrelated to the compositions of our invention, nothing is taught in this patent to lead one to our invention.

It should be noted that the coatings of the instant invention are not restricted in applicability simply to metallic surfaces, which may be susceptible both to corrosion and scaling, but are also applicable to non-metallic surfaces which may be inherently resistant to corrosion but scale-prone, such as glass, ceramics, organic polymeric materials, and the like.

In view of the foregoing evidence, it was unexpected to find that conventional, scale-prone, polyurethane-derived protective resins, even those originally compounded with a polyether polyol as the reactive hydroxylic component, if modified in their formulation so as to contain in the finished or "cured" resin pendant polyoxyalkylene chains, will become resistant to mineral scale deposition and/or adherence.

Thus, is is a broad object of this invention to provide novel, modified polyurethane resin coatings which when applied to metallic or nonmetallic substrates normally susceptible to the build-up of scale, greatly inhibit scale deposition and/or adherence thereon as compared to the uncoated substrate.

A further and more specific object of this invention is to provide processes whereby the scale-susceptibility of scale-prone surfaces is substantially lowered by application thereto of novel, modified polyurethane-type resins which possess scale inhibitory properties, and curing said resins on the said surfaces.

Yet a further and more specific object of this invention is to provide compositions of novel, modified polyurethane resins containing pendant polyoxyalkylene chains and having substantial resistance to scale deposition and/or adherence thereon.

Additional objects of this invention are the preparation from novel, modified polyurethane-type resins of scale-resistant articles of manufacture such as conduits, membranes, vessels, and the like which may be subject to service in the presence of mineralized waters.

Other objects of this invention will become apparent to those skilled in the art after a perusal of this disclosure.

The above objects are achieved through the utilization of several conceptual variations including the following:

I. The preparation of novel polyurethane resins which are highly resistant to scale deposition and/or adherence during contact with mineralized waters.

II. The use of novel polyurethane resins as coatings to impart scale resistance to substrate surfaces, which are normally scale-prone, during contact with mineralized aqueous environments.

III. The production of novel, scale-resistant, polyurethane-coated items of service such as piping, heat exchangers, storage and mixing vessels, chemical reactors, and the like which uncoated, would normally be susceptible to scale formation and/or adherence.

IV. The production from novel polyurethane resins, of scale-resistant fabricated articles of manufacture such as containers, conduits, membranes, filaments, and the like, which may be subject to usage in the presence of scale-forming mineralized waters.

V. The production from novel polyurethane resins, of fabricated articles of manufacture whose usefulness lies in applications apart from scaling problems and is due to their increased attraction and/or retention of water molecules.

The foregoing innovations comprising the gist of this invention are outlined more particularly below.

In the first compositional aspect of this invention novel polyurethane resins resistant to scale deposition are prepared by:

A. Admixing polyisocyanates, preferably aromatic polyisocyanates, with polyols having (1) a functionality of three or greater, and (2) having been prepared so as to contain polyoxyalkylene chains made up of oxethylene linkages, oxypropylene linkages, and/or combinations thereof, to form resin mixtures, said polyols being present in excess over what is required by stoichiometry to convert all of said isocyanate groups to urethane groups thus providing the requisite, pendant polyoxyalkylene chains. Usually it suffices for about 1.1 to 1.9 hydroxyl equivalents to be present per equivalent of isocyanate, with 1.3 to 1.7 being preferred, and B. Partially curing the said resin mixtures at temperatures and times sufficient to produce enough crosslinking to provide polymeric networks without sufficiently "setting" the resins to such an extent as to prevent their being applied by conventional means as coatings or being formed into fabricated articles, and without significant alteration of the integrity of the pendant polyoxyalkylene chains.

C. Applying to the surface or article to be protected from scaling, a coating of the partially cured polyurethane resin mixture by spraying, painting, dipping, or other means, and further curing the applied resin to a degree such that the resin possesses good adhesion to the substrate, stability to in-service environmental conditions, but without significantly altering the integrity of the pendant polyoxyalkylene chains in the resin.

In the second compositional aspect of this invention, novel polyurethane resins resistant to scale deposition are prepared by:

A. Admixing isocyanates, preferably aromatic polyisocyanates, with (1) an amount of conventional polyol substantially less than that stoichiometrically required for complete reaction with said polyisocyanates, said polyol having an average hydroxyl functionality of three or greater per molecule, and (2) a compound characterized by a polyoxyalkylene chain terminated at one end by an alkyl, aryl, or other radical which is nonreactive with isocyanate functional groups, and terminated at the other end by a hydroxyl group which, upon reaction with the isocyanate groups in the mixture present in excess of those required for complete reaction with the polyol component, ultimately provides the requisite pendant polyoxyalkylene chains in the mixture.

B. Partially curing the said resin mixtures at temperatures and times sufficient to produce enough crosslinking to provide polymeric networks without sufficiently setting the resins to such an extent as to prevent their being applied by conventional means as coatings or being formed into fabricated articles, and without significant alteration of the integrity of the pendant polyoxyalkylene chains.

C. Applying to the surface or article to be protected from scaling, a coating of the partially cured polyurethane resin mixture by spraying, painting, dipping, or other means, and further curing the applied resin to a degree such that the resin possesses good adhesion to the substrate, stability to in-service environmental conditions, but without significantly altering the integrity of the pendant polyoxyalkylene chains in the resin.

It should be noted that in this second compositional variation of the resins of the instant invention, the free end of the pendant polyoxyalkylene chain is terminated by a group less labile to in-service degradative chemical attack than are the terminal hydroxyl groups characteristic of the pendant chains of the first compositional variation herein above described.

In order to further supplement the understanding of the invention and to disclose the invention in close detail, the following additional information is submitted:

I. SCALE-RESISTANT SURFACES

This term as used in the instant invention refers to surfaces which have been made resistant to scale formation or build-up by protecting them with any of a group of novel polyurethane resins, which surfaces otherwise would tend toward accumulation thereon and/or adherence thereto of scale while in service in the presence of mineralized waters.

The amount of polyurethane coating required to give scale resistance is a variable dependent upon a number of factors. These include the quantity of pendant polyoxyalkylene chains attached to the polyurethane skeletal network, the average number of oxyalkylene groups per chain, the thickness and porosity of the coating, the presence or absence of "base coatings" on priming materials, the nature and concentration of the scale forming salts, and temperature of the mineralized waters. However, under so-called average conditions, a polyurethane resin formulated with 5–60% of the available hydroxyls derived from polyoxyalkylene linkages remaining unreacted and thus forming pendant polyoxyalkylene chains (in the case of the first compositional aspect) or formulated with 5–60% of the available hydroxyls composed of a polyalkylene glycol, one end of which is terminated by a radical non-reactive with isocyanates (as in the second compositional aspect), wherein the pendant polyoxyalkylene chains contain from about 2 to 50*, preferably from 3 to 30* oxyalkylene groups per chain, said coatings being in the form of 1 to 4 layers of the novel polyurethane resins, each layer being from about 1 to 3 mils thick, preferably undercoated by 1 to 3 layers of base-coating, each layer from 1 to 3 mils thick (disclosed subsequently under the designation of II) will effectively impart scale-resistance to surfaces which normally would tend to accumulate scale in the presence of mineralized waters.

The aforementioned pendant polyoxyalkylene chains present in the surfaces of the subject novel, scale-resistant polyurethane resins may be represented by the following structural formula:

$$[RESIN]-O-(CH_2-CHR-O)_nR'$$

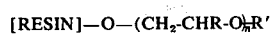

wherein R is preferably selected from the group consisting of hydrogen, methyl or ethyl, and mixtures thereof; R' is selected from hydrogen, alkyl, aryl, or other similar radicals, optionally substituted, and mixtures thereof; and $n$, which represents the average number of groups in the oxyalkylene chain, ranges from about 2 to about 50, perferably from 3 to 30. Pendant polyoxyalkylene groups of the type just described, may be created as chemically attached appendages to the polymeric skeletal network on an otherwise conventional polyurethane resin to produce the novel, scale-resistant polyurethane resin of this invention in several ways, including the following:

In one favored preparation process embodiment, an aromatic polyisocyanate is contacted with an alkylene oxide adduct of such adducts of a polyol having an average hydroxyl functionality of three or greater, such as glycerol, hexanetriol, pentaerythritol, sorbitol, etc., said adduct being present in excess over what is required by stoichiometry to react with the polyisocyanate.

The above reaction mixtures can include significant quantities of inert, evaporable diluents such as ketones, esters, ethers and the like to facilitate formulation and application. The reaction temperature, which is not especially critical, can range from about 110° to about 160° F. preferably from about 135° to about 145° F. Many suitable oxyalkylated polyol adducts are commercially available wherein the polyol has a hydroxyl number of 3 or more and the average number of oxyalkylene groups per polyoxyalkylene chain may range from about 2 to about 50. Other suitable oxyalkylated reactants can be prepared prior to reaction with the polyisocyanates by contacting the polyol with excess alkylene oxide such as ethylene oxide, propylene oxide and/or their mixtures, as well as with other sources of lower alkylene oxides such as ethylene carbonate or ethylene sulfite, preferably in the presence of base*, at temperatures ranging from about 250° F. and upward until the desired extent of oxyalkylation takes place.

\* The conditions of oxyalkylation are copiously described in the literature (i.e. Kirk Othmer, Encylcopedia of Chemical Technology, 1st Edition) as well as the Patent Literature. See Application Ser. No. 57,788, filed 7/23/70 now pending.

II. APPLICATION OF SCALE-RESISTANT COATINGS TO SUBSTRATE SURFACES

Application of the novel, scale-resistant polyurethane resin mixtures can be accomplished by spraying, painting, dipping, or other means. Each coat of the resin is subjected to an intermediate heat cure for about ¾-3 hrs. at 220°-280° F., and after the desired number of coats have been applied, the coated article is subjected to a final cure to fully set the resin but without significantly altering the integrity of the pendant polyoxyalkylene chains in the resin.

The preferred method of application involves successively applying and partially curing (1) a "pass coat" of a suitable priming material, (2) an intermediate coat of a mixture of the priming material and the novel polyurethane resin, and (3) an outer coat of the novel polyurethane resin, followed by (4) a final thermal cure.

From 1 to 3 layers of the base-coat priming material, each about 1 to 3 mils thick, is first applied to the substrate by dipping, painting, spraying or the like, but preferably by spraying; each layer of the base coat is allowed to dry or partially cure before the following one is applied. Next, from 1 to 3 layers of an intermediate coating comprising a mixture of the priming material and the novel polyurethane resin, each layer approximately 1 to 2 mils thick, are applied in a manner similar to that employed for the base coat, each layer being subjected to an intermediate cure in succession for about ¾-hrs. at about 220°-280° F. Then several outer layers, preferably between 1 and 4, made up of the novel polyurethane resin, each layer from about 1 to 3 mils thick, are applied and separately cured as described for the foregoing resin layers. Finally, the completed coating is cross-linked and consolidated by subjection to a post cure of about 1½-3½ hrs. at about 220°-280° F. Through trial and error it has been found that a total thickness of 6 to 12 mils of coatings is most effective.

While the base-coating technique is not essential in every instance to the successful application of the scale-resistant coatings of the instant invention, it may greatly improve bonding to the substrate of the novel, scale-resistant polyurethane resins, while at the same time acting to forestall possible diffusion or penetration of moisture through the outer polyurethane layers and, in the case where the substrate is metallic, resultant corrosion thereof. Non-restrictive examples of base-coat priming materials satisfactory for the instant purpose include heat-curable resins of the alkyd, epoxy, phenolic, and epoxy-modified phenolic types; resins of the latter type, widely employed for the protection of oil field tubular goods against corrosion, where chosen for use in the examples hereinafter cited simply for reasons of economics and convenience. When this particular type of resin is used as the base-coat priming material in the hereinabove described application and coating procedure, each layer is heat-cured for about ¾ to 3 hours at about 220° to 280° F.

The intermediate layers made up of a mixture of the primer and the novel, scale-resistant polyurethane resin serve as a transition zone providing interpenetration and insuring strong (chemical) bonding between the base-coat priming layers and the outer layers of novel, scale-resistant polyurethane.

III. INGREDIENTS FOR FORMULATING NOVEL, SCALE-RESISTANT POLYURETHANE RESINS

A. Polyisocyanates

Of the numerous polyisocyanates suitable for preparing the novel resins of the instant invention, tolylene diisocyanate is presently preferred for reasons of both availability and economics, since it currently is the polyisocyanate in widest use for the commercial manufacture of conventional polyurethane resins: tolylene diisocyanate is most economically obtained as a mixture of the 2,4- and 2,6-isomers, the 2,4-isomer predominating over the 2,6-isomer by 3-4 fold. Among other polyisocyanates suitable to the instant invention are 1,5-napththalene diisocyanate, m- and p-phenylene diisocyanate, 4,4 -diphenyl-iospropylidine diisocyanate, 4,4'-diphenylsulfone diisocyanate, 4,4'-diphenylmethane diisocyanate, and 4,4',4''-triphenylmethane triisocyante, as well as certain mixtures thereof.

B. Polyols

1. Conventional polyols suitable for the specific purpose of providing the polymeric backbone or skeletal structure of the novel, scale-resistant polyurethane resins, as herein above described in the first and second compositional aspects, are exemplified by glycerol, erythritol, pentaerythritol, arabitol, mannitol, polyether polyols such as polyethylene glycol, and the like; also suitable for the same purpose are linear polyester polyols of the general structural formula,

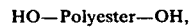

HO—Polyester—OH, which are prepared with an excess of a glycol monomer so that essentially all of the end groups are hydroxyl functions. None of the foregoing types of polyols, when used in creating the backbone of the subject resins, impart appreciable scale-resistant properties, inasmuch as they represent the same types commonly employed in the formulation of conventional polyurethane resins.

2. Suitable polyether polyols, which when reacted in stoichiometric excess with polyisocyanates serve the dual purpose of forming the backbone or skeletal structure of the novel, scale-resistant polyurethane resins while at the same time providing residual pendant polyoxyalkylene chains, as in the first compositional aspect herein described, consist of polyols having an hydroxyl functionality of about 3 or greater which have been polyoxyalkylated so that an average of about 2 to about 50 oxyalkylene groups,

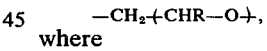

—CH₂—(CHR—O—),
where
R = alkyl,
have been added to each hydroxyl group. An example of this type of polyether polyol is the ethylene oxide adduct of glycerol,

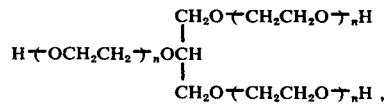

wherein n ~ 2 to 50; other suitable polyether polyols of this general description may be easily envisioned by persons skilled in the art. In certain instances, polyether polyols of the foregoing types may also be effectively used for the same dual purpose when admixed with polyols of the types described in B,1, immediately preceding.

C. Monohydric Polyethers

Polyethers of the type suitable for use in formulating novel, scale-resistant polyurethane resins, as hereinabove described in the second compositional aspect, are characterized by polyoxyalkylene chains terminated at one end by an alkyl, aryl, or other appropriate substituent which is nonreactive toward isocyanate functional groups, and terminated at the other end by a hydroxyl group which, upon reaction with the isocyanate groups in the resin reaction mixture in excess of those required for complete reaction with the polyol component, ultimately provide the requisite pendant polyoxyalkylene chains in the resin mixture. Such polyethers are of the general structural formula, $$R-O+CH_2-CHR'-O+_nH,$$

wherein R = alkyl, aryl, or other radical which is nonreactive with isocyanate functional groups, R' = alkyl, and $n \sim 3 - 50$; examples of such polyethers are the methoxy, propoxy, and phenoxy polyethylene glycols, polypropylene glycols, polyglycidyl ethers, and the like.

D. Optional Additives

To the extent that their incorporation does not substantially affect the scale-resistant properties of the subject novel, scale-resistant polyurethane resins, various materials other than the hereinabove described "active" ingredients may optionally be added to the resin formulation to impart certain supplemental special properties for particular in-service usages when deemed desirable. For example, suitable optional additives may be employed to impart such supplemental properties to the subject novel resins as pigments for color identification, "fillers" for enhancement of such physical properties as temperature stability, abrasion resistance, resilience, cohesiveness, and the like, as well as for economic advantages, and reinforcing agents for improved mechanical strength, particularly in the fabrication of scale-resistant articles of manufacture.

The use of such optional additives is well known in the art, and anyone skilled in the art of resin technology could determine which, if any, of such additives could be used advantageously in connection with the novel polyurethane resins of this invention.

IV. APPLICATION

The novel polyurethane coating of the present invention is applicable to any surface in contact with mineralized water and subject to scale deposition. The most dramatic and desirable scale resistant properties, however, are obtained when the coatings of this invention are applied to a surface to be contacted with mineralized water containing concentrations of hydrocarbons below about 5%. Hydrocarbons as used herein are defined as petroleum, tar sand tar and similar materials. It is especially preferred that the mineralized water be substantially free of the above mentioned hydrocarbons.

In addition, the scale resistant properties of this invention perform most effectively where any heat transfer taking place is from the coated surface into the mineralized water. That is, where the mineralized water is colder than the coated surface.

V. LABORATORY EVALUATION OF SURFACE SCALE RESISTANCE

Rotors 5.5 inches in length, 0.84 inches in diameter, and having a hemispherically rounded tip, are constructed from cold-rolled mild steel stock so that they can be heated by a quartz-encased coil heater which fits inside the rotor. After fabrication, the steel rotors are sand-blasted to roughen the external surface. The steel rotor is then cleaned by the use of solvents, detergents, and abrasive cleaners to provide a bare surface scrupulously free of oil, soil, or scale of any kind. The resin to be evaluated is then coated on the cleaned rotors by the procedure hereinabove described in II, "application of Scale-Resistant Coatings to Substrate Surfaces."

Except for the rotor design, the evaluation procedure used is that described in the journal "corrosion", Vol. 17, No. 5, pp. 232t-236t (May 1961), and by U.S. Pat. No. 3,488,289. The test functions by allowing a deposit of gypsum (calcium sulfate scale) from a supersaturated solution thereof to slowly accrete on the surface of a heated, rotating cylinder to the extent that the surface of the cylinder is by nature scale prone. After the test, the rotor is carefully rinsed in acetone and allowed to dry under a heat lamp. The adhering scale, if any, is carefully scraped from the rotor and weighed. The weight of scale deposited on an uncoated metal rotor, used as a control is compared to that deposited on rotors coated with conventional resins and to that deposited on rotors coated with the novel polyurethane resins.

Scale-resistant articles of manufacture which may be prepared from the novel, polyurethane resins described herein include conduits, membranes, vessels, and the like which may be subject to service in the presence of mineralized waters where, if said articles were manufactured from conventional, seale-prone substances, mineral scaling would occur. Such manufactured articles might include castings, composites, and laminates of the novel resins with or without inclusion of optional additives such as reinforcing agents and fillers as described in III, D, above.

The following examples are illustrative of the production of typical scale-resistant polyurethane resins in accordance with the present invention. It will be understood that similar reactants can be utilized, proportions modified, temperatures, times, concentrations, and other conditions altered, all within the guiding principles taught herein, without departing from the essential teachings herein disclosed.

EXAMPLE I

PREPARATION OF SCALE-RESISTANT POLYURETHANES USING POLYETHER POLYOLS AS SOURCES OF PENDANT POLYOXYLAKYLENE CHAINS

A. A charge of 15.7 g (0.09 mole) of tolylene-2,4diisocyanate and 45.2 g (0.11 mole) of a propylene oxide adduct of glycerol having an average molecular weight of 400 was introduced into a stirred reaction vessel which could be heated or cooled. This reaction mixture was diluted with 40 ml. of methyl isobutyl ketone, heated with stirring to 140° F., and held at this temperature for one hour. After cooling to room temperature, the scale-resistant polyurethane resin so formed was ready for application as a coating.

B. A similar scale-resistant resin was obtained when the same weight of an 80/20 (w/w)% mixture of tolylene-2,4-diisocyanate/tolylene-2,6-diisocyanate was substituted for the tolylene-2,4-diisocyanate as used in reaction "A", above.

EXAMPLE II

PREPARATION OF SCALE-RESISTANT POLYURETHANES USING MONOHYDRIC POLYETHERS AS SOURCES OF PENDANT POLYOXYALKYLENE CHAINS

A. Using a reaction vessel as in the preceding examples, 17.4 g (0.01 mole) of tolylene-2,4-diisocyanate was diluted with 40.1 ml. of methyl isobutyl ketone, and heated with stirring to 140° F. A mixture of 21.0 g (0.0525 mole) of a propylene oxide adduct of glycerol having an average molecular weight of 400 and 3.5 g (0.01 ) mole of a methoxy polyethylene glycol of average molecular weight of 350 was slowly added with stirring to the heated diisocyanate solution. The heating and stirring were continued for an additional half hour, after which time the reaction mixture was cooled to room temperature for subsequent application as a coating.

B. The reactor of the type used in the preceding examples was added a mixture of 40.0 ml. of methylisobutyl ketone and 17.4 g (0.10 mole) of tolylene-2,4-diisocyanate, and this mixture heated with stirring to 140° F. To this solution was added a mixture of 18.6 g (0.0465 mole) of the propylene oxide adduct of glycerol and 7.0 g (0.02 mole) of a methoxy polyethylene glycol, these latter two materials being the same as used in Example II, dissolved in 20 ml. of methyl isobutyl ketone. Heating and stirring were continued for an additional half hour, after which time the reaction mixture was cooled and used for application as a coating.

Three control rotors were prepared as follows, for quantitative comparison of scale-resistant properties with rotors coated using the novel polyurethane resins of Examples I and II:

Control Rotor 1: A cleaned, sand-blasted, cold-rolled steel rotor coated with 2 one mil coatings of a conventional, thermosetting phenolic resin, each coat being cured for one hour at 250° F.

Control Rotor 2: A cleaned, sand-blasted, cold-rolled steel rotor coated with the conventional phenolic resin in the same manner as Control Rotor 1 and further coated with a conventional water-resistant, but scale-susceptible, commercial polyurethane resin.

Control Rotor 3: A bare, stainless steel rotor.

All rotors were evaluated by the procedure hereinabove discussed and the results are presented in the following table.

TABLE I

SCALE DEPOSITION RESULTS

| ROTOR COATING | SCALE DEPOSITED |
|---|---|
| 1. Resin from Example I, A | 0.17 g. |
| 2. Resin from Example I, B | 0.18 g. |
| 3. Resin from Example II, A | 0.13 g. |
| 4. Resin from Example II, B | 0.00 g. |
| 5. Conventional Polyurethane Resin (Control Rotor 1) | 0.51 g. |
| 6. Conventional Phenolic Resin (Control Rotor 2) | 1.23 g. |
| 7. None - Stainless Steel Blank (Control Rotor 3) | 1.46 g. |

VI. FIELD EVALUATION

Hobbs, New Mexico (Monument Area)

Two field tests have been performed. Parallel test sections, each containing bare steel, conventional polyurethane coated, and polyurethane coated nipples of the type described herein were installed as bypasses to the flow lines of two producing wells with histories of scale deposition. The production from one of the wells contained about 40% water while the other contained about 60% water. Inspection of the test nipples gave the following information:

1. A thin deposit of scale (predominately gypsum) was observed on the bare steel nipples.
2. No deposition was apparent on the conventional polyurethane coating.
3. A deposit similar to that on the bare steel nipples was found on the polyurethane coating of the invention.

Odem Field

Parallel test sections as above, were installed between a collection manifold and a heater-treater. Substantial amounts of calcium carbonate scale, precipitated from solution, deposited on all of the nipples, apparently from settling.

To avoid settling, the test was modified to allow the insertion of a nipple coated with the polyurethane coating of the invention in a vertical position. Scale deposition again occurred.

The fluid passing through these nipples was produced brine containing traces (up to a few percent) of crude oil. The brine was warmer than the pipe causing heat to flow from the brine into the coated nipple.

Conclusions

Based on the above results, it appears that the polyurethane coating of the invention is less effective in service where more than a few percent of oil is present in the mineralized water and where the heat flow is from the water to the coated surface. In the laboratory tests in "V" above the heat flow was from the coated surface into the mineralized water.

VII. PREPARATION OF A SCALE-RESISTANT ARTICLE OF MANUFACTURE

A rectangular section of fibre glass matting was coiled into a cylinder which was then impregnated with the novel polyurethane resin of Example Ii and cured at 250° F. for 2 hours to consolidate and cross-link the resin. The wall thickness of the cylinder was built up to the desired extent by successively applying a layer of the resin and curing that layer for one hour at 250° F. A final cure was accomplished by heating the cylinder at 250° f. for 2.5 hours.

As the several examples and disclosures have indicated, the subject invention is advantageous insofar as both compositional and applicational aspects are concerned. In their compositional aspects, the scale-resistant polyurethane resins are easily prepared from readily available reactants under moderate reaction conditions; and, in their applicational aspects, the said resins exhibit long-term resistance to scale deposition and/or adherence, even at elevated temperatures in the presence of oxygen. Inasmuch as scale-resistant coatings, or fabricated articles of manufacture, may be produced from modified polyurethane resins whose structural departure from that of conventional (scale-prone) polyurethane resins is simply that they bear pendant, polyoxylalkylene chains attached to the basic polyurethane skeletal network, the inventive concept is a considerable and unexpected departure from the art.

Further, the utility of these novel, scale-resistant polyurethane resin is diverse: they are suitable for protecting both metallic and non-metallic substrates from scale deposition and/or adherence, and may also be used for the production of scale-resistant articles of manufacture. Finally, the novel resins of this invention can be used to make composites and laminates for applications apart from scaling problems.

In view of the diversity of applications, the metes and bounds of this invention are best gleaned from the claims which follow when read in conjunction with this specification.

We claim:

1. A process of preparing novel, partially cured polyurethane resins for imparting scale-resistant properties to substrate surfaces normally susceptible to mineral scale formation while in contact with mineralized water containing less than about 5 percent hydrocarbons and wherein any heat flow is from the substrate surface into the mineralized water comprising the steps of:
   a. admixing at least one aromatic polyisocyanate with a stoichiometric excess of polyol component, at least a portion of which is composed of polyoxyalkylated polyols having a functionality of three or greater, each of the polyoxyalkylene chains of said polyols containing an average of 3 to 50 oxyalkylene groups, and monohydric polyethers having the structural formula $$R-O+(CH_2-CHR'-O)_nH$$

wherein R is alkyl, aryl or other radical which is non-reactive with isocyanate functional groups, R' is alkyl and n is an integer from about 3 to about 50 the remainder of said polyol component consisting of conventional polyols, and
   b. partially heat curing said polyurethane resin mixture containing pendant polyoxyalkylene chains at temperatures and times sufficient to produce enough crosslinking to provide polymeric networks without substantially setting the resins to such an extent as to preclude their being applied by conventional means as coatings or being formed into fabricated articles of commerce, and without substantially altering the integrity of the pendant polyoxyalkylene chains.

2. The process of claim 1 wherein the polyisocyanate is a tolylene diisocyanate and the conventional polyol is a polyether polyol.

3. The process of claim 1 wherein the polyisocyanate is a tolylene diisocyanate and the conventional polyol is a linear polyester polyol of the general structure: HO-polyester—OH.

4. The process of claim 1 wherein the oxyalkylene groups of the polyoxyalkylene chains are selected from the group consisting of oxyethylene, oxypropylene and mixtures thereof.

5. A process for preparing novel, partially cured polyurethane resins for imparting scale-resistant properties to substrate surfaces normally susceptible to mineral scale formation while in contact with mineralized water containing less than about 5 percent hydrocarbons and wherein any heat flow is from the substrate surface into the mineralized water containing pendant polyoxyalkylene chains comprising the steps of:
   a. admixing at least one aromatic polyisocyanate with an amount of polyol substantially less than that stoichiometrically required for complete reaction with said polyisocyanate, said polyol having an average hydroxyl functionality of at least 3 per molecule, with
   b. a monohydric polyether having the structural formula $$R-O+(CH_2-CHR'-O)_nH$$

wherein R is alkyl, aryl or other radical which is non-reactive with isocyanate functional groups, R' is alkyl and n is an integer from about 3 to about 50, and
   c. partially heat curing said polyurethane resin mixtures containing pendant polyoxyalkylene groups at temperatures and times sufficient to produce enough crosslinking to provide polymeric networks without sufficiently setting said resins to prevent their being applied by conventional means as coatings or their fabrication into articles of manufacture and without significant alteration of the integrity of the pendant polyoxyalkylene chains.

6. The process of claim 5 wherein the oxyalkylene of the polyoxyalkylene chains are selected from the group consisting of oxyethylene, oxypropylene and mixtures thereof, and said chains contain an average of about 3 to about 50 oxyalkylene groups.

7. The process of claim 5 wherein the polyol is a linear polyester polyol of the structure HO-polyester-OH and the polyisocyanate is a mixture of 2,4- and 2,6-tolylene diisocyanates.

8. The process of claim 5 wherein the novel polyurethane resins are fabricated into articles of manufacture and post-cured to substantially crosslink the resins.

9. The process of claim 1 wherein the novel polyurethane resins are fabricated into articles of manufacture and postcured to substantially crosslink the resins.

10. The novel polyurethane resin produced by the process of claim 1.

11. The novel polyurethane resin produced by the process of claim 5.

* * * * *